(12) United States Patent
Escaro et al.

(10) Patent No.: US 11,196,167 B2
(45) Date of Patent: Dec. 7, 2021

(54) MANUFACTURING METHOD OF ANTENNA PATTERN, MANUFACTURING METHOD OF RFID INLAY, MANUFACTURING METHOD OF RFID LABEL, AND MANUFACTURING METHOD OF RFID MEDIUM

(71) Applicant: SATO HOLDINGS KABUSHIKI KAISHA, Tokyo (JP)

(72) Inventors: Rodly Escaro, Tokyo (JP); Yoshimitsu Maeda, Saitama (JP); Faiz Adi Ezarudin Bin Adib, Kanagawa (JP); Miki Ota, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/961,746

(22) PCT Filed: Jan. 31, 2019

(86) PCT No.: PCT/JP2019/003508
§ 371 (c)(1),
(2) Date: Jul. 13, 2020

(87) PCT Pub. No.: WO2019/163472
PCT Pub. Date: Aug. 29, 2019

(65) Prior Publication Data
US 2021/0091474 A1    Mar. 25, 2021

(30) Foreign Application Priority Data
Feb. 21, 2018 (JP) .............................. JP2018-029073

(51) Int. Cl.
*H01Q 9/26* (2006.01)
*G06K 19/07* (2006.01)
*B42D 25/305* (2014.01)
*G06K 19/077* (2006.01)
*H01Q 1/22* (2006.01)

(52) U.S. Cl.
CPC .............. *H01Q 9/26* (2013.01); *B42D 25/305* (2014.10); *G06K 19/0723* (2013.01); *G06K 19/0775* (2013.01); *H01Q 1/2283* (2013.01)

(58) Field of Classification Search
CPC ...... H01Q 9/26; H01Q 1/2283; B42D 25/305; G06K 19/0723; G06K 19/0775
USPC ....................................................... 343/702
See application file for complete search history.

(56) References Cited

U.S. PATENT DOCUMENTS

| | | | | |
|---|---|---|---|---|
| 10,886,606 | B2 * | 1/2021 | Kamgaing | ............. H01Q 19/22 |
| 2005/0183817 | A1 * | 8/2005 | Eckstein | ............... B32B 37/025 |
| | | | | 156/278 |
| 2005/0184872 | A1 * | 8/2005 | Clare | ................. G06Q 30/0283 |
| | | | | 340/572.1 |

(Continued)

FOREIGN PATENT DOCUMENTS

| | | |
|---|---|---|
| JP | 2012-194743 A | 10/2012 |
| WO | WO-2017/159222 A1 | 9/2017 |

*Primary Examiner* — Michael G Lee
*Assistant Examiner* — David Tardif
(74) *Attorney, Agent, or Firm* — Foley & Lardner LLP

(57) ABSTRACT

The manufacturing method of the antenna pattern has: a step of forming a dipole antenna on a front surface of a continuous substrate while conveying the continuous substrate; and a step of forming a sub-element on a back surface of the continuous substrate.

9 Claims, 3 Drawing Sheets

(56) References Cited

U.S. PATENT DOCUMENTS

2005/0187837 A1* 8/2005 Eckstein ............... G06Q 30/04
　　　　　　　　　　　　　　　　　　　　　　705/29
2015/0363685 A1* 12/2015 Teng ............... G06K 19/07718
　　　　　　　　　　　　　　　　　　　　　　156/250
2018/0039878 A1　 2/2018 Akamatsu et al.
2020/0302261 A1* 9/2020 Maeda ............. G06K 19/07749
2021/0056375 A1* 2/2021 Lotya .................... H05K 1/165

* cited by examiner

MANUFACTURING METHOD OF ANTENNA PATTERN, MANUFACTURING METHOD OF RFID INLAY, MANUFACTURING METHOD OF RFID LABEL, AND MANUFACTURING METHOD OF RFID MEDIUM

TECHNICAL FIELD

The present invention relates to a manufacturing method of an antenna pattern, a manufacturing method of an RFID inlay, a manufacturing method of an RFID label, and a manufacturing method of an RFID medium.

BACKGROUND ART

In the field of manufacture, management, logistics, and so forth of products, tags that are attached to the products and labels that are adhered to the products, etc. are used. Information related to the products are printed on the tags and the labels so as to be visible. In recent years, a technique utilizing an RFID (Radio Frequency Identification), in which identification information written on an IC chip is transmitted and received via a wireless communication, is becoming more and more common in various fields, and the technique is also becoming more familiar in the above-described fields.

On the tag, the label, an wrist band, and so forth (hereinafter, referred to as an RFID medium) incorporated an antenna pattern and the IC chip with an RFID specification as described above, information related to a target for attachment, a target for affixation, or an wearer (hereinafter, collectively referred to as an adherend) is printed so as to be visible, and it is possible to store various information related to the adherend in the incorporated IC chip.

Conventionally, in manufacturing steps of a RFID inlay, as an example of a method for forming the antenna pattern, a method, in which a resist layer having the antenna pattern is printed on a metal foil laminated on a substrate, and portions of the metal foil other than the antenna pattern are removed by a chemical etching, is used (see JP2012-194743A).

SUMMARY OF INVENTION

In the method for forming the antenna pattern by the etching disclosed in JP2012-194743A, facilities for printing the resist layer and facilities for performing the chemical etching are required. Furthermore, a step of removing the resist layer is required.

As described above, manufacturing facilities and manufacturing steps for performing the etching process cause an increase in a manufacturing cost, and it is difficult to improve manufacturing efficiency. In addition, for example, there is a tendency of diversification of antenna patterns to be formed on the substrate. Therefore, further improvement has been required for the manufacturing steps of the antenna pattern.

Thus, an object of the present invention is to manufacture an antenna pattern with an improved productivity.

According to an aspect of the present invention, provided is a manufacturing method of an antenna pattern having a dipole antenna formed on a first surface of a substrate and a sub-element formed on a second surface of the substrate, the method including: a first adhesive-agent coating step of coating an adhesive agent at inner side of an edges of the dipole antenna formed on a first surface of a continuous substrate while conveying the continuous substrate; a first metal-foil placement step of placing a continuous metal-foil on the adhesive agent on the continuous substrate, the continuous metal-foil being configured to form the dipole antenna; a first cutting step of forming a cut for the dipole antenna in the continuous metal-foil; a first removal step of removing an unwanted portion that does not form the dipole antenna in the continuous metal-foil; a second adhesive-agent coating step of coating the adhesive agent at inner side of an edges of the sub-element formed on the second surface; a second metal-foil placement step of placing the continuous metal-foil on the adhesive agent coated in the second adhesive-agent coating step, the continuous metal-foil being configured to form the sub-element; a second cutting step of forming a cut for the sub-element in the continuous metal-foil placed in the second metal-foil placement step; and a second removal step of removing an unwanted portion that does not form the sub-element in the continuous metal-foil placed in the second metal-foil placement step.

According to the above-described aspects, it is possible to manufacture the antenna pattern with an improved productivity.

DESCRIPTION OF EMBODIMENTS

RFID Inlay and Antenna Pattern

Before explaining a manufacturing method of an antenna pattern according to this embodiment, an RFID inlay 1 that is manufactured by using the manufacturing method of the antenna pattern will be described.

Figure 1A:
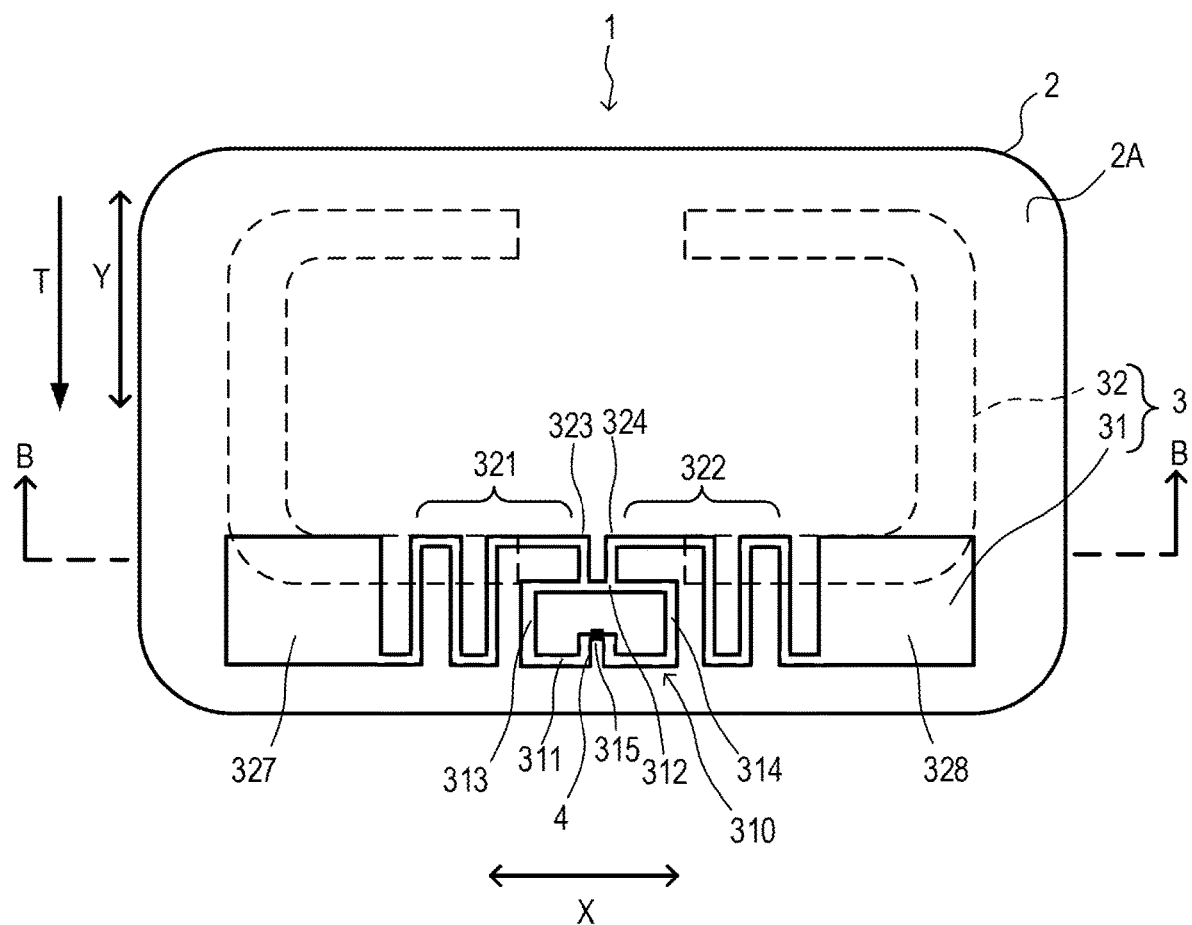
FIG. 1A is an external view for explaining a front surface of an RFID inlay that is manufactured by using a manufacturing method of an antenna pattern according to this embodiment.
Figure 1B:
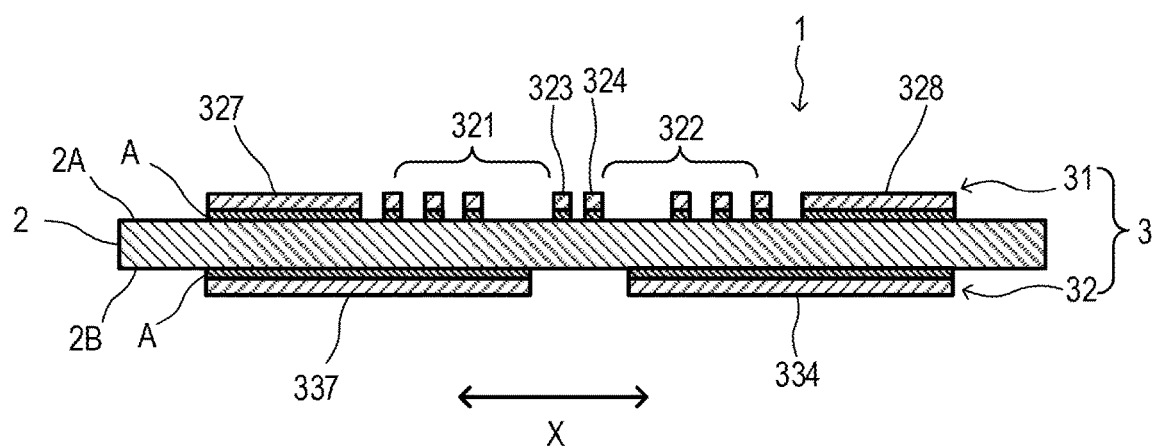
FIG. 1B is a sectional view taken along a line B-B in FIG. 1A.
Figure 2:
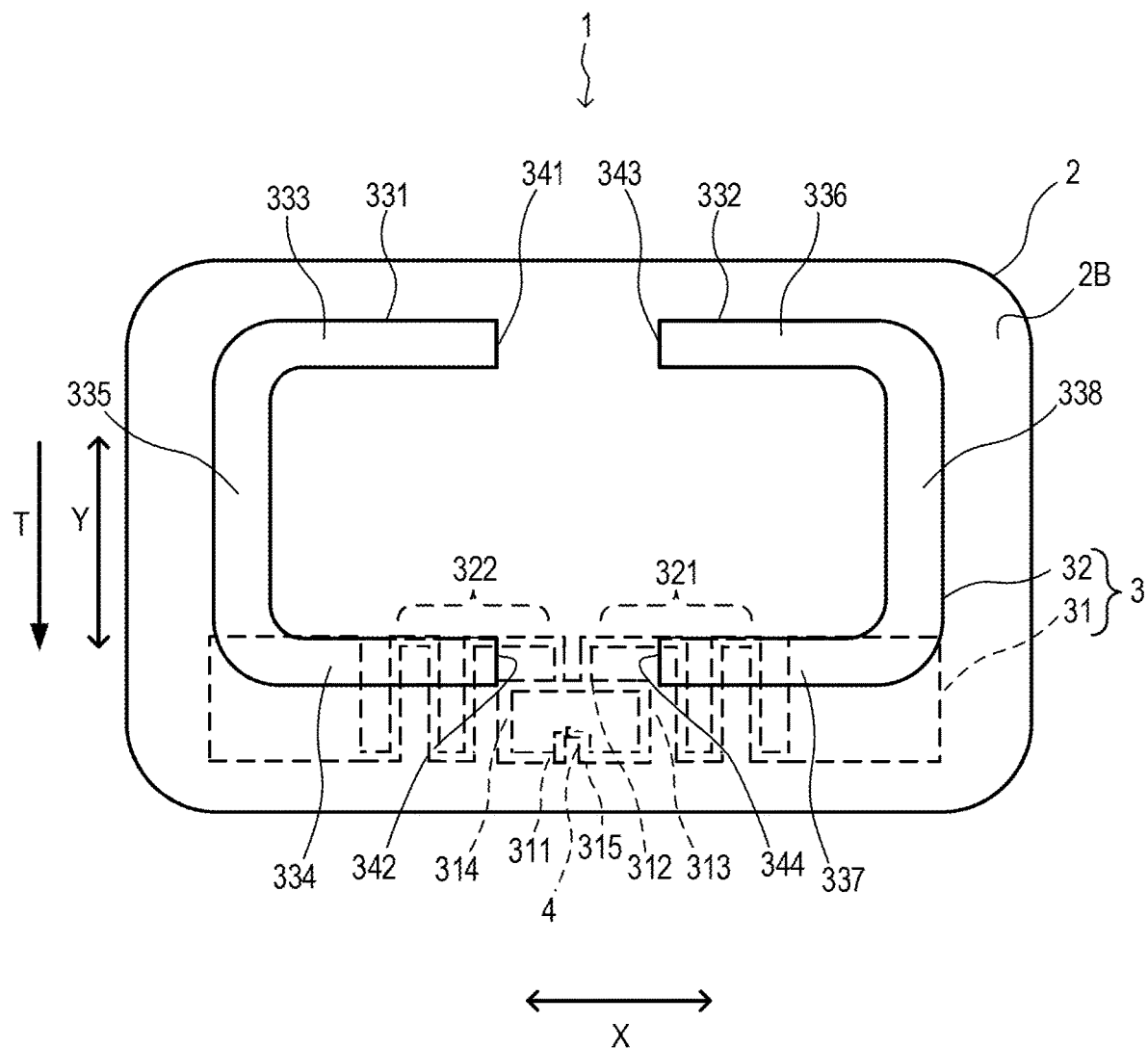
FIG. 2 is an external view for explaining a back surface of an RFID inlay 1 that is manufactured by using the manufacturing method of the antenna pattern according to this embodiment.

FIG. 1A is an external view for explaining a front surface of the RFID inlay 1 that is manufactured by using the manufacturing method of the antenna pattern according to this embodiment, and FIG. 1B is a sectional view taken along a line B-B in FIG. 1A. In addition, FIG. 2 is an external view for explaining a back surface of the RFID inlay 1 that is manufactured by using the manufacturing method of the antenna pattern according to this embodiment. An arrow T shown in FIGS. 1 and 2 corresponds to the conveying direction in a manufacturing apparatus 100 shown in FIG. 3.

As shown in FIG. 1, the RFID inlay 1 is provided with a substrate 2, an antenna pattern 3, and an IC chip 4 with an RFID (Radio Frequency Identification) specification connected to the antenna pattern 3.

The antenna pattern 3 is provided with a dipole antenna 31 that is formed on a front surface 2A of the substrate 2 with a metal foil and a sub-element 32 that is formed on a back surface 2B of the substrate 2 with the metal foil. As shown in FIG. 1B, the dipole antenna 31 and the sub-element 32 are laminated on the substrate 2 with an adhesive agent A.

In FIG. 1, the sub-element 32 that is formed on the back surface 2B is illustrated with a dotted line. In addition, in FIG. 2, the dipole antenna 31 that is formed on the front surface 2A is illustrated with a dotted line.

In this embodiment, the direction in which the dipole antenna 31 extends is described as the X direction of the RFID inlay 1, and the direction perpendicular to the X direction is described as the Y direction of the RFID inlay 1. In the above, the arrow T shown in FIG. 1 corresponds to the conveying direction T shown in FIG. 3.

In this embodiment, the dipole antenna 31 is formed on the front surface 2A of the substrate 2 with the metal foil and has a loop portion 310 on which the IC chip 4 is mounted. The loop portion 310 is formed in left-right symmetry with respect to the IC chip 4.

In this embodiment, the loop portion 310 is formed as a rectangular loop having long-side portions 311 and 312 and short-side portions 313 and 314. A gap 315 in which the IC chip 4 is mounted is formed at the center portion of the long-side portion 311 on one side of the loop portion 310.

On the front surface 2A, the dipole antenna 31 has meanders 321 and 322 that are formed so as to extend in the opposite directions with each other with respect to the loop portion 310 and capacitance hats 327 and 328 that are connected to the meanders 321 and 322, respectively. In the above, connection ends (referred to as meander end portion) 323 and 324 of the meanders 321 and 322 with the loop portion 310 are connected to the long-side portion 312 of the loop portion 310. In addition, the other end portions of the meanders 321 and 322 are connected to the capacitance hats 327 and 328, respectively.

The meander end portions 323 and 324 are connected to the vicinity of the center portion of the long-side portion 312 on one side of the loop portion 310, and the long-side portion 311 facing the long-side portion 312 is formed with, at a position at which the long-side portion 311 is shifted towards the center portion side, the gap 315 in which the IC chip 4 is mounted.

Next, the sub-element 32 will be described with reference to FIG. 2. The sub-element 32 are provided by forming a pair of U-shaped elements 331 and 332 on the back surface 2B. The element 331 and the element 332 each has U-shape and are formed such that their opening portions face each other so as to be in line symmetrical with respect to a line that is parallel to the Y direction of the RFID inlay 1 and passes through the IC chip 4.

In this embodiment, the element 331 has parallel portions 333 and 334 that are formed in parallel with the X direction in which the dipole antenna 31 extends and a perpendicular portion 335 that joins end portions of the parallel portions 333 and 334. In addition, the element 332 has parallel portions 336 and 337 that are formed in parallel with the X direction in which the dipole antenna 31 extends and a perpendicular portion 338 that joins end portions of the parallel portions 336 and 337.

The elements 331 and 332 are formed so as to be symmetrical with each other such that end portions (tip end portions) 341 and 343 on the one ends oppose to each other and end portions (base end portions) 342 and 344 on the other ends oppose to each other. In addition, in this embodiment, the base end portions 342 and 344 are formed at positions so as to be overlapped with parts of the dipole antenna 31 through the substrate 2.

In this embodiment, the dipole antenna 31 in the antenna pattern 3 is designed as a pattern adapted to a UHF frequency band (300 MHz to 3 GHz, especially, 860 MHz to 960 MHz). In addition, the sub-element 32 has a function such that the antenna pattern 3 has an overall non-directional by adjusting the directivity of the dipole antenna 31.

The RFID inlay 1 having the above-described configuration is subjected to a predetermined processing, and thereby, it is possible to form an RFID medium such as, in addition to a label, a tag, the wrist band, a ticket, a card, and so forth.

Manufacturing Method of Antenna Pattern

Figure 3:
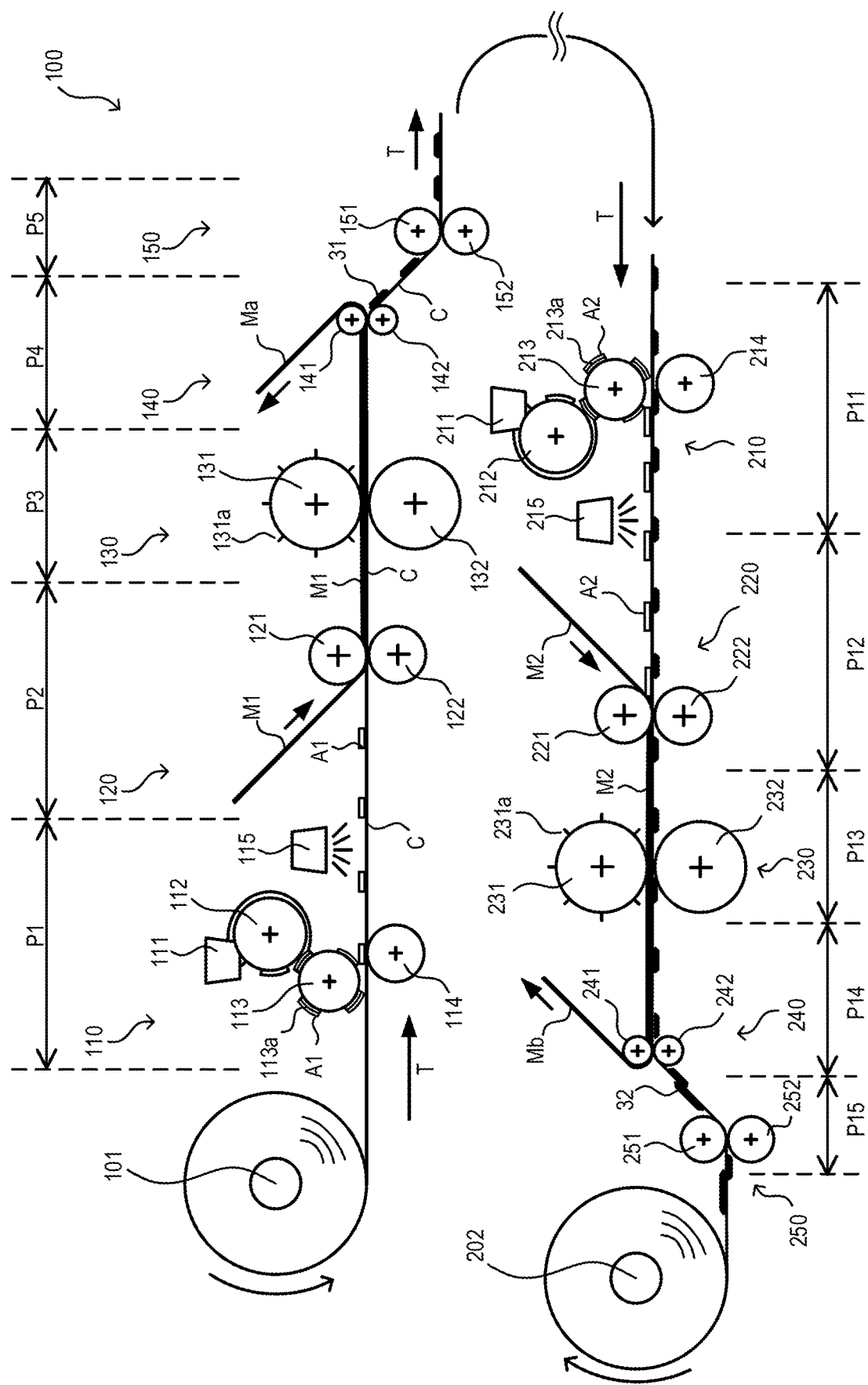
FIG. 3 is a schematic view of a manufacturing apparatus for practicing the manufacturing method of the antenna pattern according to the embodiment of the present invention.

The manufacturing method of the antenna pattern according to the embodiment of the present invention will be described below with reference to the drawings. FIG. 3 is a schematic view of the manufacturing apparatus 100 for practicing the manufacturing method of the antenna pattern according to this embodiment. For the convenience of illustration, in FIG. 3, a series of steps in the manufacturing method of the antenna pattern are shown in a folded arrangement.

As shown in FIG. 3, the manufacturing method of the antenna pattern according to this embodiment has a step of forming the dipole antenna 31 on a first surface (the front surface 2A) of a continuous body C for the substrate 2 and a step of forming the sub-element 32 on a second surface (the back surface 2B) of the continuous body C for the substrate 2.

In FIG. 3, a series of steps for forming the dipole antenna 31 on the front surface 2A of the substrate 2 are shown in an upper part, and a series of steps forming the sub-element 32 on the back surface 2B of the substrate 2 are shown in a lower part. Although the series of manufacturing steps are separated in the upper part and the lower part, for the convenience of illustration, they are continuously arranged in practice.

As steps for forming the dipole antenna 31 on the front surface 2A of the continuous body C for the substrate 2, the manufacturing method of the antenna pattern according to this embodiment has: a first adhesive-agent coating step P1 in which the adhesive agent A is coated on the first surface of the continuous body C for the substrate 2 while conveying the continuous body C; a first metal-foil placement step P2 in which a continuous metal-foil M is placed on a surface of the continuous body C on which the adhesive agent A has been coated; a first cutting step P3 in which cut for the antenna pattern 3 is formed in the continuous metal-foil M; and a first removal step P4 in which an unwanted portion Ma in the continuous metal-foil M that does not form the antenna pattern 3 is removed.

In addition, the manufacturing method has a first pressing step P5 in which pressure is applied on the antenna pattern 3 on the continuous body C remaining after the unwanted portion Ma has been removed. The arrow T in FIG. 3 shows the conveying direction.

The first adhesive-agent coating step P1 is performed by an adhesive-agent coating unit 110.

The adhesive-agent coating unit 110 has an adhesive agent tank 111 that stores the adhesive agent, a feed roller 112 that feeds the adhesive agent from the adhesive agent tank 111, a plate roller 113 that receives an adhesive agent A1 from the feed roller 112 and transfers it to the continuous body C, and an impression cylinder 114. In addition, the adhesive-agent coating unit 110 has a UV lamp 115 that irradiates ultraviolet light to the adhesive agent A1.

The plate roller 113 is formed by wrapping, on a plate cylinder, a plate on which relief patterns 113a each corresponding to the shape of the adhesive agent A1 to be coated on the continuous body C for the substrate 2 are formed. The plate roller 113 is formed with a plurality of relief patterns 113a. The plurality of relief patterns 113a are imposed so as to be arranged side by side in the sending direction and the width direction of the plate roller 113. With such a configuration, a plurality of the adhesive agents A1 for dipole antennas can be transferred to and coated on the continuous body C at the same time.

Each of the relief patterns 113a has a shape that fits in the inner side of the edges of the dipole antenna 31 formed on the substrate 2. In the above, in the inner side of the edges of the dipole antenna 31, a coating position of the adhesive agent A is aligned such that an upstream side blank space in the conveying direction is wider than a downstream side blank space in the conveying direction.

If the blank space is too wide, an edge portion of the dipole antenna 31 may be lifted up or separated. In addition, if the blank space is too narrow, the adhesive agent A may be squeezed out from the perimeter portion of the dipole antenna 31. From this point of view, the upstream blank space in the conveying direction is preferably from 50 μm to 300 μm, inclusive, and the downstream blank space in the conveying direction is preferably from 30 μm to 100 μm, inclusive (where, the upstream blank space in the conveying direction>the downstream blank space in the conveying direction is satisfied).

The thickness of the adhesive agent A1 coated on the continuous body C is preferably from 3 μm to 25 μm, inclusive. If the thickness is equal to or thicker than 3 μm, adhesive force sufficient for adhering the dipole antenna 31 is achieved, and if the thickness is equal to or thinner than 25 μm, the adhesive agent A1 is prevented form being squeezed out from the edges of the dipole antenna 31 by the pressurization. From this point of view, the thickness of the adhesive agent A1 is preferably from 3 μm to 10 μm, inclusive.

In the above, although not shown in FIG. 3, prior to the first adhesive-agent coating step P1, a step of printing a reference mark is performed. The reference mark can be used as the reference for alignment when the adhesive agent A1 is transferred to the continuous body C and as the reference for alignment for the position of the cut when the cut for the dipole antenna 31 is formed.

In this embodiment, a material that can be applied as the substrate 2 (the same applies to the continuous body C, which will be described below) includes papers such as fine quality paper, coated paper, and so forth; and a single film made of a resin such as polyvinyl chloride, polyethylene terephthalate, polypropylene, polyethylene, polyethylene naphthalate, and so forth, and a multilayer film formed by laminating a plurality of the resin films.

The thickness of the substrate 2 is preferably from 25 μm to 300 μm, inclusive. In a case in which the papers are used as the substrate, the thickness can be from 50 μm to 260 μm, inclusive, in the above-described range, and it is generally preferable that the thickness be 80 μm. In addition, in a case in which the resin film is used as the substrate, the thickness can be from 25 μm to 200 μm, inclusive, in the above-described range. From the above, it is possible to make an appropriate selection depending on an application purpose.

The adhesive agent A1 that can be applicable in the first adhesive-agent coating step P1 includes acrylic adhesive agents, urethane adhesive agents, silicone adhesive agents, rubber adhesive agents, and so forth. In this embodiment, in view of subjecting the continuous body C being conveyed to a coating in a mode of a flexographic printing or a relief printing, it is preferable to use an adhesive agent having an ultraviolet curing property. Besides, it is also possible to apply a screen printing.

The adhesive agent A1 has an adhesive force of, preferably 500 gf/25 mm or more, more preferably 800 gf/25 mm or more, and even more preferably 1000 gf/25 mm or more as measured by 180° separation test (JIS Z 0237 2009). Preferably, the upper limit value for the adhesive force is 2000 gf/25 mm.

The first metal-foil placement step P2 is performed by a metal-foil placing unit 120.

The metal-foil placing unit 120 has a pressure roller 121 and a support roller 122. In the metal-foil placing unit 120, a continuous metal-foil M1 that has been conveyed through a conveying path that is different from a conveying path of the continuous body C is overlaid on the surface of the continuous body C on which the adhesive agent A1 has been coated, and the continuous metal-foil M1 and the continuous body C are conveyed between the pressure roller 121 and the support roller 122 and laminated together. Because there is no adhesive agent outside the edges of the dipole antenna 31, the continuous metal-foil M1 adheres to the continuous body C only inside a region for forming the dipole antenna 31.

In general, as a metal for forming the metal foil, an electrically conductive metal used for forming the antenna pattern can be applied. One example thereof includes copper and aluminum. In view of suppressing the manufacturing cost, it is preferable to use aluminum. In addition, in view of an overall thickness of the RFID inlay 1, of an overall thickness of the RFID medium when the RFID medium is formed, and of the manufacturing cost, it is preferable that a thickness of the metal foil be from 3 μm to 25 μm, inclusive. In this embodiment, an aluminum foil having the thickness of 20 μm is used.

The first cutting step P3 is performed by a cutting unit 130.

The cutting unit 130 has a die roller 131 that forms the cuts for the dipole antenna 31 in the continuous metal-foil M1 formed on the continuous body C and a backup anvil roller 132 of the die roller 131. Projected cutting portions 131a each having a shape of the edges of the dipole antenna 31 are formed on a front surface of the die roller 131. A flexible die can be used as the projected cutting portions 131a. Besides, an engraving blade, an inserted blade, and so forth may also be employed.

The cutting unit 130 defines the dipole antennas 31 by making the projected cutting portions 131a cut into the continuous metal-foil M1 while continuously conveying a workpiece formed of the continuous body C and the continuous body M1 by inserting it between the rollers. By doing so, it is possible to form the cuts in the continuous metal-foil M1.

The first removal step P4 is performed by a removing unit 140.

The removing unit 140 is provided with peel rollers 141 and 142. The conveying direction of the unwanted portion Ma of the metal foil is caused to be changed along a part of the peel roller 141, and the workpiece is caused to be conveyed along a part of the peel roller 142 in the direction different from the conveying direction of the unwanted portion Ma, and thereby, the unwanted portion Ma of the metal foil is separated away from the workpiece formed of the continuous body C and the continuous body M1. After recovered, the unwanted portion Ma is subjected to a recycling process and is again used as the continuous metal-foil M1.

The first pressing step P5 is performed by a pressurizing unit 150.

The pressurizing unit 150 is provided with a pressure roller 151 and a support roller 152. In the pressurizing unit 150, the workpiece is inserted and pressurized between the pressure roller 151 and the support roller 152, and thereby, the adhesive agent A1 is squeezed and spread over the entire surface of the dipole antenna 31 on which the adhesive agent A1 has been coated on the continuous body C. The pressure is preferably from 2 kg/cm to 6 kg/cm, inclusive.

Subsequent to the first pressing step P5, the workpiece in which the dipole antenna 31 is formed on the continuous body C for the substrate 2 is subjected to a step of forming the sub-element 32 on the back surface 2B shown in the lower part in FIG. 3.

As steps for forming the sub-element 32 on the back surface 2B of the continuous body C for the substrate 2, the manufacturing method has: a second adhesive-agent coating step P11 in which an adhesive agent A2 is coated on the back surface of the continuous body C while conveying the continuous body C for the substrate 2; a second metal-foil placement step P12 in which a continuous metal-foil M2 is placed on a surface on which the adhesive agent A2 has been coated; a second cutting step P13 in which the cut for the sub-element 32 is formed in the continuous metal-foil M2; and a second removal step P14 in which an unwanted portion Mb in the continuous metal-foil M2 that does not form the sub-element 32 is removed.

In addition, the manufacturing method has a second pressing step P15 in which the unwanted portion Mb is removed and pressure is applied on the sub-element 32 remaining on the continuous body C.

The second adhesive-agent coating step P11 is performed by an adhesive-agent coating unit 210. The adhesive-agent coating unit 210 having the same mechanism as that used in the first adhesive-agent coating step P1 can be used.

In the adhesive-agent coating unit 210, the adhesive agent A2 that has been fed from an adhesive agent tank 211 by a feed roller 212 is transferred to the continuous body C by a plate roller 213 and an impression cylinder 214. Ultraviolet light is irradiated by an UV lamp 215 to the adhesive agent A2 that has been transferred on the continuous body C.

The plate roller 213 is formed by wrapping, on a plate cylinder, a plate on which relief patterns 213a each corresponding to the shape of the adhesive agent A2 to be coated on the continuous body C for the substrate 2. In the plate roller 213, each of the relief patterns 213a has a shape that fits in the inner side of the edges of the sub-element 32 formed on the substrate 2. In the above, a type, thickness, adhesive force, and so forth of the adhesive agent A2 coated on the continuous body C may be the same as those for the adhesive agent A1.

The second metal-foil placement step P12 can be performed by a metal-foil placing unit 220. The metal-foil placing unit 220 having the same mechanism as that used in the first metal-foil placement step P2 can be used.

In the metal-foil placing unit 220, the continuous metal-foil M2 that has been conveyed through a conveying path that is different from the conveying path of the continuous body C is overlaid on the surface of the continuous body C on which the adhesive agent A2 has been coated, and the continuous metal-foil M2 and the continuous body C are conveyed between a pressure roller 221 and a support roller 222 and laminated together. Because there is no adhesive agent outside the edges of the sub-element 32, the continuous metal-foil M2 adheres to the continuous body C only inside a region for forming the sub-element 32.

As the metal for forming the metal foil, those used for the first metal-foil placement step P2 can be used.

The second cutting step P13 can be performed by a cutting unit 230. The cutting unit 230 having the same mechanism as that used in the first cutting step P3 can be used.

The cutting unit 230 has a die roller 231 that forms the cuts for the sub-element 32 in the continuous metal-foil M2 formed on the continuous body C and a backup anvil roller 232 of the die roller 231. Projected cutting portions 231a each having a shape of the edges of the sub-element 32 are formed on a front surface of the die roller 231.

The second removal step P14 can be performed by a removing unit 240. The removing unit 240 having the same mechanism as that used in the first removal step P4 can be used.

In the removing unit 240, the conveying direction of the unwanted portion Mb of the metal foil is caused to be changed along a part of a peel roller 241, and the workpiece is caused to be conveyed along a part of the peel roller 142 in the direction different from the conveying direction of the unwanted portion Mb, and thereby, the unwanted portion Mb of the metal foil is separated away from the workpiece formed of the continuous body C and the continuous body M2. After recovered, the unwanted portion Mb is subjected to a recycling process and is again used as the continuous metal-foil M1, M2.

The second pressing step P15 can be performed by a pressurizing unit 250. The pressurizing unit 250 having the same mechanism as that used in the first pressing step P5 can be used.

In the pressurizing unit 250, the workpiece is inserted and pressurized between a pressure roller 251 and a support roller 252, and thereby, the adhesive agent A2 is squeezed and spread over the entire surface of the sub-element 32 on which the adhesive agent A2 has been coated on the continuous body C.

Subsequent to the second pressing step P15, the continuous body C on which the dipole antenna 31 and the sub-element 32 are formed is wound up by an winch roller 202.

Next, an operation and operational advantages thereby in the manufacturing apparatus 100 that performs the manufacturing method of the antenna pattern described above will be described.

According to the manufacturing apparatus 100, in the first adhesive-agent coating step P1, the continuous body C for the substrate 2 fed out from a feed roller 101 passes through between the plate roller 113 and the impression cylinder 114, and thereby, the adhesive agent A1 is coated on the continuous body C in the regions in which the dipole antennas 31 are to be formed, in other words, in the regions at the inner side of the edges of the dipole antennas 31.

Next, in the first metal-foil placement step P2, the continuous metal-foil M1 is overlaid on the continuous body C on which the adhesive agent A1 has been coated.

Subsequently, in the first cutting step P3, in the workpiece formed of the continuous body C and the continuous metal-foil M1, the cuts for the antenna patterns 3 are formed by the die roller 131 formed with the projected cutting portions 131a each having the shape of the edges of the dipole antenna 31.

Next, in the first removal step P4, the unwanted portion Ma that does not form the dipole antennas 31 in the continuous metal-foil M1 is removed.

Next, in the first pressing step P5, the pressure is applied to the dipole antennas 31 formed on the continuous body C.

Subsequently, in the second adhesive-agent coating step P11, the adhesive agent A2 is coated in the regions in which the sub-elements 32 are to be formed, in other words, in the regions at the inner side of the edges of the sub-elements 32.

Next, in the second metal-foil placement step P12, the continuous metal-foil M2 is overlaid on the continuous body C on which the adhesive agent A2 has been coated.

Next, in the second cutting step P13, in the workpiece formed of the continuous body C and the continuous metal-foil M2, the cuts for the sub-element 32 are formed.

Next, in the second removal step P14, the unwanted portion Mb that does not form the sub-elements 32 in the continuous metal-foil M2 is removed.

Next, in the second pressing step P15, the pressure is applied to the sub-element 32 formed on the continuous body C. By performing above-described steps, it is possible to form the antenna patterns 3 on the front surface 2A and the back surface 2B of the continuous body C for the substrate 2. The continuous body C on which the dipole antennas 31 and the sub-elements 32 are formed is wound up by the winch roller 202.

According to the manufacturing method of the antenna pattern using the manufacturing apparatus 100 according to the embodiment described above, it is possible to form the antenna patterns 3 on both surfaces of the continuous body C. Thus obtained antenna patterns 3 have uniform quality and consistency.

According to this embodiment, in the first pressing step P5, the workpiece is inserted between the pressure roller 151 and the support roller 152 in the pressurizing unit 150 and the workpiece is pressurized, and thereby, the adhesive agent A1 is squeezed and spread over the entire surface of the dipole antenna 31. In addition, by applying the pressure, agglutination of the adhesive agent A1 is achieved, and so, it is possible to cause the dipole antenna 31 to be adhered to the continuous body C tightly.

Therefore, it is possible to set a conveying speed of the workpiece without considering a peeling force, breakage caused by the peeling force, and so forth of the unwanted portion Ma, Mb made of the metal foil.

In addition, because the adhesive agent A1, A2 is not adhered to the unwanted portion Ma, Mb made of the metal foil, and in addition, because there is no risk of adhesion of other contaminant due to adhesion of the adhesive agent A1, A2 to the unwanted portion Ma, Mb, advantages such as a preferable handling property after the recovery and excellent reusability of the metal foil are achieved.

Manufacturing Method of RFID Inlay

Next, a manufacturing method of the RFID inlay according to the embodiment of the present invention will be described. The manufacturing method of the RFID inlay according to this embodiment has an IC-chip mounting step in which the IC chip 4 is mounted on the workpiece manufactured by the manufacturing method of the antenna pattern described above.

In a mounting step, the IC chip 4 is mounted in a specific position in the antenna pattern 3, in other words, in the gap 315 formed in the loop portion 310 in the dipole antenna 31 by using a conductive material.

As a method for connecting the IC chip 4, as an example, a vulcanization bonding using an anisotropic conductive paste or a conductive film may be used.

Manufacturing Method (1) of RFID Label

Next, a manufacturing method of an RFID label according to another embodiment of the present invention will be described.

The manufacturing method of the RFID label according to another embodiment of the present invention uses the substrate 2 having an information recording surface as the substrate 2 in the manufacturing apparatus 100. In other words, in the manufacturing apparatus 100 described above, the RFID inlay 1 is manufactured by using the substrate 2 having the information recording surface, and a separator is temporarily adhered using the adhesive agent on a surface on the reverse side of a printing surface.

By doing so, for example, it is possible to manufacture the RFID label in which the back surface 2B of the RFID inlay 1 also serves as the printing surface and the front surface 2A thereof serves as an adhering surface. In addition, for an application purpose in which the RFID label is adhered to a part that is not exposed to the outside, such as a case in which the adherend is an interior of an apparatus, the substrate provided with the information recording surface may not necessarily be required.

Manufacturing Method (2) of RFID Label

Next, the manufacturing method of the RFID label according to the embodiment of the present invention will be described. The manufacturing method of the RFID label according to this embodiment has: a step of temporarily placing the separator, with the adhesive agent, on either one of the front surface 2A or the back surface 2B of the continuous body C for the RFID inlay 1 that is formed by using the manufacturing apparatus 100, and a step of placing, with the adhesive agent or adhesive, an outer substrate having the printing surface on a surface of the substrate 2 on the reverse side of the surface on which the separator has been temporarily placed in a state in which the printing surface faces outward.

By doing so, for example, it is possible to manufacture the RFID label in which the front surface 2A of the RFID inlay 1 is covered by the outer substrate having the printing surface and the back surface 2B serves as the adhering surface.

In the above, for example, it may be possible to arrange the substrate having the printing surface on the back surface 2B of the substrate 2 and to temporarily adhere the separator to the front surface 2A with the adhesive agent.

Manufacturing Method of RFID Medium

Next, a manufacturing method of the RFID medium according to the embodiment of the present invention will be described.

The manufacturing method of the RFID medium according to the embodiment of the present invention has a step of placing a first outer substrate with the adhesive agent on the first surface of the substrate 2 after the RFID inlay 1 has been manufactured by the manufacturing apparatus 100 and a step of placing a second outer substrate with the adhesive agent on the second surface of the substrate 2. By doing so, for example, it is possible to manufacture the RFID medium in which both of the front surface 2A and the back surface 2B are covered by the outer substrate.

In this embodiment, the first outer substrate and the second outer substrate protect the antenna pattern 3 and the IC chip 4 that are formed on the substrate 2 and determine a form such as the tag (especially, the tag for apparel industry), the label, the wrist band, ticket, and so forth. It is possible to select the thickness and material in accordance with the desired application purpose.

In the manufacturing method of the RFID label according to this embodiment, as the bonding agent for adhering the first and second outer substrates to the RFID inlay 1, it may be possible to use emulsion bonding agents, solvent bonding agents, and hot melt bonding agents. In addition, it may also be possible to use the adhesive agent. As the bonding agent, it is possible to apply acrylic bonding agents, urethane bonding agents, silicone bonding agents, rubber bonding agents, and so forth. In addition, as the adhesive agent, it is possible to apply the adhesive agent such as the acrylic adhesive agents, the urethane adhesive agents, the silicone adhesive agents, acrylic rubber adhesive agents, and so forth.

Other Embodiment

Although the embodiments of the present invention have been described in the above, the above-mentioned embodiments merely illustrate a part of application examples of the present invention, and the technical scope of the present invention is not intended to be limited to the specific configurations of the above-described embodiments.

In this embodiment, a description has been given of a case in which the dipole antenna 31 is formed on the front surface 2A and the sub-element 32 is formed on the back surface 2B as the antenna pattern 3. However, the front surface 2A and the back surface 2B are named for the sake of ease of explaining, and a configuration in which, in FIGS. 1 and 2, the sub-element 32 is formed on the front surface 11A and the dipole antenna 31 is formed on the back surface 11B has equivalent advantages. In addition, in the manufacturing apparatus 100, the sub-element 32 may be formed first, and the dipole antenna 31 may be formed thereafter.

In the above-described embodiment, the substrate 2 may be a thermal paper. In addition, in the manufacturing method of the antenna pattern according to this embodiment, prior to the first adhesive-agent coating step P1, and also prior to the second adhesive-agent coating step P11, a step of forming an undercoat layer may be provided in order to improve adhesiveness of the adhesive agent A1, A2 to the continuous body C for the substrate 2.

In the manufacturing method of the antenna pattern according to this embodiment, in the first removal step P4 and the second removal step P14, in addition to separation of the unwanted portion Ma, Mb of the metal foil from the workpiece using the peel rollers 141, 142, 241, 242, a suction mechanism for removing the unwanted portion Ma, Mb by suction may be provided. With such a configuration, it is possible to reliably remove metal foil pieces that tend to remain on the workpiece if the separation is performed only by using the peel rollers 141, 142, 241, 242.

In the manufacturing method of the antenna pattern according to this embodiment, subsequent to the first pressing step P5, the continuous body C may be wound up once. All steps may not be continuously performed.

The present application claims a priority based on Japanese Patent Application No. 2018-029073 filed on Feb. 21, 2018 in the Japan Patent Office, the entire contents of which are incorporated herein by reference.

The invention claimed is:

1. A manufacturing method of an antenna pattern having a dipole antenna formed on a first surface of a substrate and a sub-element formed on a second surface of the substrate, the method comprising:
   a first adhesive-agent coating step of coating an adhesive agent at inner side of an edges of the dipole antenna formed on a first surface of a continuous substrate while conveying the continuous substrate;
   a first metal-foil placement step of placing a continuous metal-foil on the adhesive agent on the continuous substrate, the continuous metal-foil being configured to form the dipole antenna;
   a first cutting step of forming a cut for the dipole antenna in the continuous metal-foil;
   a first removal step of removing an unwanted portion that does not form the dipole antenna in the continuous metal-foil;
   a second adhesive-agent coating step of coating the adhesive agent at inner side of an edges of the sub-element formed on the second surface;
   a second metal-foil placement step of placing the continuous metal-foil on the adhesive agent coated in the second adhesive-agent coating step, the continuous metal-foil being configured to form the sub-element;
   a second cutting step of forming a cut for the sub-element in the continuous metal-foil placed in the second metal-foil placement step; and
   a second removal step of removing an unwanted portion that does not form the sub-element in the continuous metal-foil placed in the second metal-foil placement step.

2. The manufacturing method of the antenna pattern according to claim 1, wherein
   in the first adhesive-agent coating step and the second adhesive-agent coating step, a position for coating the adhesive agent is aligned such that a blank space between the edges of the antenna pattern and the adhesive agent coated at the inner side of the edges is wider along an upstream side in a conveying direction.

3. The manufacturing method of the antenna pattern according to claim 2, further comprising
   a pressing step of applying pressure on the dipole antenna and the sub-element placed on the continuous substrate.

4. The manufacturing method of the antenna pattern according to claim 2, wherein
   the unwanted portion is removed by suction in the first removal step and the second removal step.

5. The manufacturing method of the antenna pattern according to claim 1, wherein
   the unwanted portion is removed by suction in the first removal step and the second removal step.

6. A manufacturing method of an RFID inlay provided with an antenna pattern and an IC chip connected to a dipole antenna, the antenna pattern having the dipole antenna formed on a first surface of a substrate and a sub-element formed on a second surface of the substrate, the method comprising:
   a first adhesive-agent coating step of coating an adhesive agent at inner side of an edges of the dipole antenna formed on a first surface of a continuous substrate while conveying the continuous substrate;
   a first metal-foil placement step of placing a continuous metal-foil on the adhesive agent on the continuous substrate, the continuous metal-foil being configured to form the dipole antenna;
   a first cutting step of forming a cut for the dipole antenna in the continuous metal-foil;
   a first removal step of removing an unwanted portion that does not form the dipole antenna in the continuous metal-foil;
   a second adhesive-agent coating step of coating the adhesive agent at inner side of a edges of the sub-element formed on the second surface;

a second metal-foil placement step of placing the continuous metal-foil on the adhesive agent coated in the second adhesive-agent coating step, the continuous metal-foil being configured to form the sub-element;
a second cutting step of forming a cut for the sub-element in the continuous metal-foil placed in the second metal-foil placement step;
a second removal step of removing an unwanted portion that does not form the sub-element in the continuous metal-foil placed in the second metal-foil placement step; and
an IC-chip mounting step of mounting the IC chip by using a conductive material on a specific position on the dipole antenna.

7. A manufacturing method of an RFID label adhered to an adherend, the RFID label being provided with an antenna pattern and an IC chip connected to a dipole antenna, the antenna pattern having a substrate with a printing surface, the dipole antenna formed on a first surface of the substrate, and a sub-element formed on a second surface of the substrate, the method comprising:
a first adhesive-agent coating step of coating an adhesive agent at inner side of an edges of the dipole antenna formed on a first surface of a continuous substrate while conveying the continuous substrate;
a first metal-foil placement step of placing a continuous metal-foil on the adhesive agent on the continuous substrate, the continuous metal-foil being configured to form the dipole antenna;
a first cutting step of forming a cut for the dipole antenna in the continuous metal-foil;
a first removal step of removing an unwanted portion that does not form the dipole antenna in the continuous metal-foil;
a second adhesive-agent coating step of coating the adhesive agent at inner side of an edges of the sub-element formed on the second surface;
a second metal-foil placement step of placing the continuous metal-foil on the adhesive agent coated in the second adhesive-agent coating step, the continuous metal-foil being configured to form the sub-element;
a second cutting step of forming a cut for the sub-element in the continuous metal-foil placed in the second metal-foil placement step;
a second removal step of removing an unwanted portion that does not form the sub-element in the continuous metal-foil placed in the second metal-foil placement step;
an IC-chip mounting step of mounting the IC chip by using a conductive material on a specific position on the dipole antenna; and
a step of temporarily adhering a separator with the adhesive agent on a surface of the substrate on a reverse side of the printing surface.

8. A manufacturing method of an RFID label adhered to an adherend, the RFID label being provided with an antenna pattern and an IC chip connected to a dipole antenna, the antenna pattern having the dipole antenna formed on a first surface of a substrate and a sub-element formed on a second surface of the substrate, the method comprising:
a first adhesive-agent coating step of coating an adhesive agent at inner side of an edges of the dipole antenna formed on a first surface of a continuous substrate while conveying the continuous substrate;
a first metal-foil placement step of placing a continuous metal-foil on the adhesive agent on the continuous substrate, the continuous metal-foil being configured to form the dipole antenna;
a first cutting step of forming a cut for the dipole antenna in the continuous metal-foil;
a first removal step of removing an unwanted portion that does not form the dipole antenna in the continuous metal-foil;
a second adhesive-agent coating step of coating the adhesive agent at inner side of an edges of the sub-element formed on the second surface;
a second metal-foil placement step of placing the continuous metal-foil on the adhesive agent coated in the second adhesive-agent coating step, the continuous metal-foil being configured to form the sub-element;
a second cutting step of forming a cut for the sub-element in the continuous metal-foil placed in the second metal-foil placement step;
a second removal step of removing an unwanted portion that does not form the sub-element in the continuous metal-foil placed in the second metal-foil placement step;
an IC-chip mounting step of mounting the IC chip by using a conductive material on a specific position on the dipole antenna;
a step of temporarily adhering a separator with the adhesive agent on either one of the first surface or the second surface of the substrate; and
a step of placing an outer substrate having an information recording surface on a surface of the substrate on a reverse side of the surface on which the separator is placed, the outer substrate being placed with the adhesive agent or an adhesive in a state in which the information recording surface faces outward.

9. A manufacturing method of an RFID medium provided with an antenna pattern and an IC chip connected to a dipole antenna, the antenna pattern having the dipole antenna formed on a first surface of a substrate and a sub-element formed on a second surface of the substrate, the method comprising:
a first adhesive-agent coating step of coating an adhesive agent at inner side of an edges of the dipole antenna formed on a first surface of a continuous substrate while conveying the continuous substrate;
a first metal-foil placement step of placing a continuous metal-foil on the adhesive agent on the continuous substrate, the continuous metal-foil being configured to form the dipole antenna;
a first cutting step of forming a cut for the dipole antenna in the continuous metal-foil;
a first removal step of removing an unwanted portion that does not form the dipole antenna in the continuous metal-foil;
a second adhesive-agent coating step of coating the adhesive agent at inner side of an edges of the sub-element formed on the second surface;
a second metal-foil placement step of placing the continuous metal-foil on the adhesive agent coated in the second adhesive-agent coating step, the continuous metal-foil being configured to form the sub-element;
a second cutting step of forming a cut for the sub-element in the continuous metal-foil placed in the second metal-foil placement step;

a second removal step of removing an unwanted portion that does not form the sub-element in the continuous metal-foil placed in the second metal-foil placement step;

an IC-chip mounting step of mounting the IC chip by using a conductive material on a specific position on the dipole antenna;

a step of placing a first outer substrate on the first surface of the substrate with the adhesive agent; and a step of placing a second outer substrate on the second surface of the substrate with the adhesive agent.

\* \* \* \* \*